United States Patent

Aho

[11] Patent Number: 5,842,684
[45] Date of Patent: Dec. 1, 1998

[54] MULTI-SPEED WINCH

[75] Inventor: Richard E. Aho, Fort Lauderdale, Fla.

[73] Assignee: Milemarker, Inc., Ft. Lauderdale, Fla.

[21] Appl. No.: 792,585

[22] Filed: Jan. 30, 1997

[51] Int. Cl.$^6$ ................... B66D 1/22; B66D 1/08
[52] U.S. Cl. ................ 254/344; 254/323; 254/361
[58] Field of Search .................... 254/344, 342, 254/323, 328, 361

[56] References Cited

U.S. PATENT DOCUMENTS

| | | | |
|---|---|---|---|
| 2,406,156 | 8/1946 | Nardone | 254/344 |
| 2,552,859 | 5/1951 | Nardone | 254/344 |
| 2,959,396 | 11/1960 | Lawrence | 254/172 |
| 2,989,288 | 6/1961 | Smith | 254/344 |
| 3,035,414 | 5/1962 | Smith | 60/53 |
| 3,788,605 | 1/1974 | Johnson | 254/150 |
| 3,962,935 | 6/1976 | Hutton et al. | 74/812 |
| 4,122,731 | 10/1978 | Bendure et al. | 74/674 |
| 4,161,126 | 7/1979 | Winzeler | 74/674 |
| 4,227,680 | 10/1980 | Hrescak | 254/344 |
| 4,453,430 | 6/1984 | Sell | 74/770 |
| 4,461,460 | 7/1984 | Telford | 254/344 |
| 4,489,919 | 12/1984 | Ostrobrod | 254/346 |
| 4,650,163 | 3/1987 | Peterson | 254/327 |
| 4,658,850 | 4/1987 | Uchino | 137/101 |
| 4,736,929 | 4/1988 | McMorris | 254/344 |
| 4,746,100 | 5/1988 | Davenport et al. | 254/379 |
| 4,950,125 | 8/1990 | Gravenhorst | 414/569 |
| 5,176,364 | 1/1993 | Bell | 254/291 |
| 5,474,278 | 12/1995 | Cleveland | 254/334 |
| 5,522,582 | 6/1996 | Dilks | 254/323 |

Primary Examiner—Katherine Matecki
Attorney, Agent, or Firm—Luedeka, Neely & Graham, P.C.

[57] ABSTRACT

A multi-speed winch is attached to a motor vehicle and is hydraulically powered by the vehicle's power steering system or other hydraulic source innate to the host vehicle. The winch operates in either a low-speed, high-torque mode for moving heavy loads, a high-speed, low-torque mode for quickly releasing or retrieving cable, a free-spooling mode for manually releasing cable, and a brake mode for holding the cable and load at a fixed position. The high-speed mode is enabled by coupling the drive shaft directly to the winch drum. The low-speed mode is enabled by coupling the drive shaft to the winch drum through a planetary gear assembly. In an alternate embodiment, high-speed mode is enabled by coupling the drive shaft to the winch drum through one of two planetary gear assemblies. Free-spooling mode is achieved by disengaging the drive shaft from the winch drum, and brake mode is achieved by engaging both the direct drive coupling and the sun and planet gear arrangement. The four operational modes are selected by four different combinations of positions of a direct drive selector handle (which determines the position of the coupling plate) and a gear reduction handle (which determines the position of the locking pin). In an alternative embodiment, the four operational modes are selected by four different combinations of positions of a direct drive solenoid and a gear reduction solenoid. A four-way, dual solenoid-operated valve controls the flow of pressurized hydraulic fluid to the winch motor.

28 Claims, 12 Drawing Sheets

MULTI-SPEED WINCH

TECHNICAL FIELD

The present invention is directed to a multi-speed hydraulic vehicle winch which utilizes the vehicle's power steering system as a source of hydraulic power.

BACKGROUND OF THE INVENTION

The advantages of having a winch mounted to a vehicle have long been appreciated. For off-road adventures, a winch provides a highly effective means for extraction of the vehicle when stuck in mud or when the vehicle has become high-centered in rough terrain. The winch extends the range of the vehicle by encouraging the off-road adventurer to push the vehicle's performance envelope where he would otherwise be afraid to do so, and when that envelope has been exceeded, to bring the vehicle back to within its operational imitations. The winch can be used for endless other applications as well, including rescuing other vehicles from perilous mud holes, moving large objects such as felled trees, and towing other vehicles.

While it is necessary to have low-speed, high-torque winch operation to move heavy loads, it is often desirable to operate the winch at a higher speed to quickly take up slack in a cable before moving a load or to quickly retrieve a long length of cable after a load has been moved. A convenient and reliable means of switching between high-speed, low-torque operation and low-speed, high-torque operation in a vehicle-mounted winch is not known to have been achieved.

Traditionally, the majority of vehicle winches have been powered by electric motors connected to the vehicle battery, such as the winch disclosed by Dilks in U.S. Pat. No. 5,522,582. These electric winches require large amounts of electrical power which can quickly deplete the vehicle battery as well as result in overloading of the winch motor during extended operation.

Hydraulic winches are known to offer several advantages over electric winches. Hydraulic winches are generally more powerful, less complex, smaller, capable of extended operation without undue stress on the motor, and meet high standards for reliability and maintainability. Hydraulic winches have been traditionally designed and adapted for use in specific applications. For example, Gravenhorst, U.S. Pat. No. 4,950,125 discloses the use of a radial piston hydraulic motor in a backhoe-to-crane conversion kit for improved free-fall characteristics; U.S. Pat. No. 5,176,364 to Bell discloses the use of a cable reel winching system having multiple spools and driven by a diesel engine for use on oil and gas wells; and U.S. Pat. No. 4,650,163 to Peterson discloses a hydraulic winch with quick connect features for mounting to the three-point hitch of a tractor.

At least one attempt has been made to incorporate a hydraulic winch onto more non-commercial vehicles. U.S. Pat. No. 3,788,605 to Johnson discloses a single-speed hydraulic winch having a hydraulic motor contained within a cable spool for use on an automobile or boat. The hydraulic motor can be operated by hydraulic pressure from the power steering pump of an automobile or by the hydraulic pressure supply system on a boat. However, the Johnson winch does not provide multi-speed winch operation or reliable system operation, and it does not account for vehicle safety or human safety.

SUMMARY OF THE INVENTION

Therefore, it is an object of the present invention to provide a vehicle-mounted winch which provides multi-speed operation.

Another object of the present invention is to provide a winch which can be easily attached to a vehicle's existing hydraulic power supply and electrical system.

Another object of the present invention is to provide a winch which is capable of sustained, heavy load operation.

Another object of the present invention is to provide a winch which incorporates simplicity and low cost.

Another object of the present invention is to provide a winch which is capable of operating in forward, reverse, free-spooling, and braking modes.

Another object of the present invention is to provide a winch which is remotely operable to enable the operator to maintain a safe position during operation of the winch.

Regarding the foregoing and other objects of the invention, the present invention provides a multi-speed winch consisting of a motor rotating a drive shaft which, through a gear reduction assembly, rotates a winch drum. In the preferred embodiment, the winch drum also can be directly driven by the drive shaft such that the winch drum and the drive shaft rotate at the same speed. Selective coupling means allow an operator to switch between high-torque, low-speed operation and low-torque, high-speed operation.

In a preferred embodiment of the invention, a planetary gear reduction assembly is disclosed, consisting of a ring gear and a plurality of planetary gears. The planet gears, which are driven by the drive shaft, mesh with and rotate about the ring gear. The planet gear shafts are connected to the winch drum so that, when low-speed operation is selected, the winch drum rotates at the same speed as the planet gears orbiting the drive shaft.

Also disclosed in the preferred embodiment is a free-spool mode in which the ring gear is free to rotate within the winch housing, thus decoupling the winch drum from the drive shaft. In this mode, the winch drum may rotate freely to allow rapid unspooling of cable.

The means for selecting high- or low-speed operation include a coupling plate which couples the winch drum to the drive shaft, and a mechanism for axially moving the coupling plate relative to the drive shaft. When the coupling plate is axially moved to engage the drive shaft, the winch drum turns at the same speed as the drive shaft. When the coupling plate is axially moved to disengage the drive shaft, the winch drum turns at a reduced speed as determined by the gear reduction ratio of the gear reduction assembly.

In the preferred embodiment, a manual means of shifting between high- and low-speed operation is disclosed. A spring in compression urges a piston against the coupling plate which pushes the coupling plate to engage the drive shaft and causes the winch drum to rotate at high-speed. A handle attached to a cam allows the operator to pull the piston back to disengage the coupling plate from the drive shaft so that the winch drum rotates at low-speed.

An alternative embodiment provides for remotely switching between low- and high-speed operation. In this embodiment, a solenoid system is disclosed which pulls the piston back to disengage the drive shaft when the solenoid coil is energized by electrical power from the vehicle battery.

The present invention also provides a fail-safe, multi-speed hydraulic winch that utilizes a vehicle's hydraulic steering system as a source of hydraulic pressure. A valve having a plurality of valve positions controls hydraulic fluid flow to a hydraulic motor. The valve has at least one input port connected to the vehicle's hydraulic steering system for receiving hydraulic fluid and at least one output port connected to the hydraulic motor for sending hydraulic fluid. The vehicle's hydraulic steering system continuously supplies pressurized hydraulic fluid to the valve, and the valve controls the flow of pressurized hydraulic fluid to the motor. Pressurized hydraulic fluid supplied to the valve is continuously returned to the hydraulic steering system. Connected to the valve are positioning means for placing the valve in a selected position as determined by a controller, which selectively directs electrical power to the valve positioning means in response to user inputs.

In the preferred embodiment of the invention, a four-port hydraulic valve assembly is disclosed. The valve assembly has first and second electrical coils for controlling, by means of a controller, the flow of pressurized hydraulic fluid between the hydraulic steering system of a vehicle and an accessory hydraulic winch motor attached to the vehicle. Each of the first and second electrical coils have energized and de-energized states. A first valve port is connected to the hydraulic steering system for continuously receiving pressurized hydraulic fluid from the hydraulic steering system. A second valve port is connected to the hydraulic steering system for continuously outputting pressurized hydraulic fluid to the hydraulic steering system. A third valve port is connected to the winch motor for supplying pressurized hydraulic fluid to the winch motor when the first electrical coil is in an energized state, thereby turning the winch motor in a first direction. A fourth valve port is connected to the winch motor for supplying pressurized hydraulic fluid to the winch motor when the second electrical coil is in an energized state, thereby turning the winch motor in a second direction.

In the preferred embodiment of the invention, a hydraulic winch controller is disclosed. The controller controls the operation of a hydraulic winch that is attached to a vehicle having a battery by selective energization of one or more valve solenoids attached to a hydraulic control valve. Interconnecting the controller to the vehicle battery and the valve solenoid is an electrical connector connected to one end of an elongate electrical cord. The other end of the electrical cord is connected to the safety switch of a control unit. The safety switch is moveable through a range of positions and selectively energizes the valve solenoid when it is manually depressed.

Also disclosed in the preferred embodiment is a cooler connected to the hydraulic steering system for cooling the hydraulic fluid.

BRIEF DESCRIPTION OF THE DRAWINGS

The invention will now be described in further detail with reference to the drawings wherein like reference characters designate like or similar elements throughout the several drawings as follows:

FIG. 4 is a diagram of a preferred embodiment of a remote controller for the winch of

FIGS. 1A–D;

DETAILED DESCRIPTION OF THE PREFERRED EMBODIMENT

In accordance with a preferred embodiment of the present invention as shown in FIGS, 1A–1D, the hardware configuration for a hydraulic, multi-speed, vehicle winch 10 is illustrated.

Figure 1A:
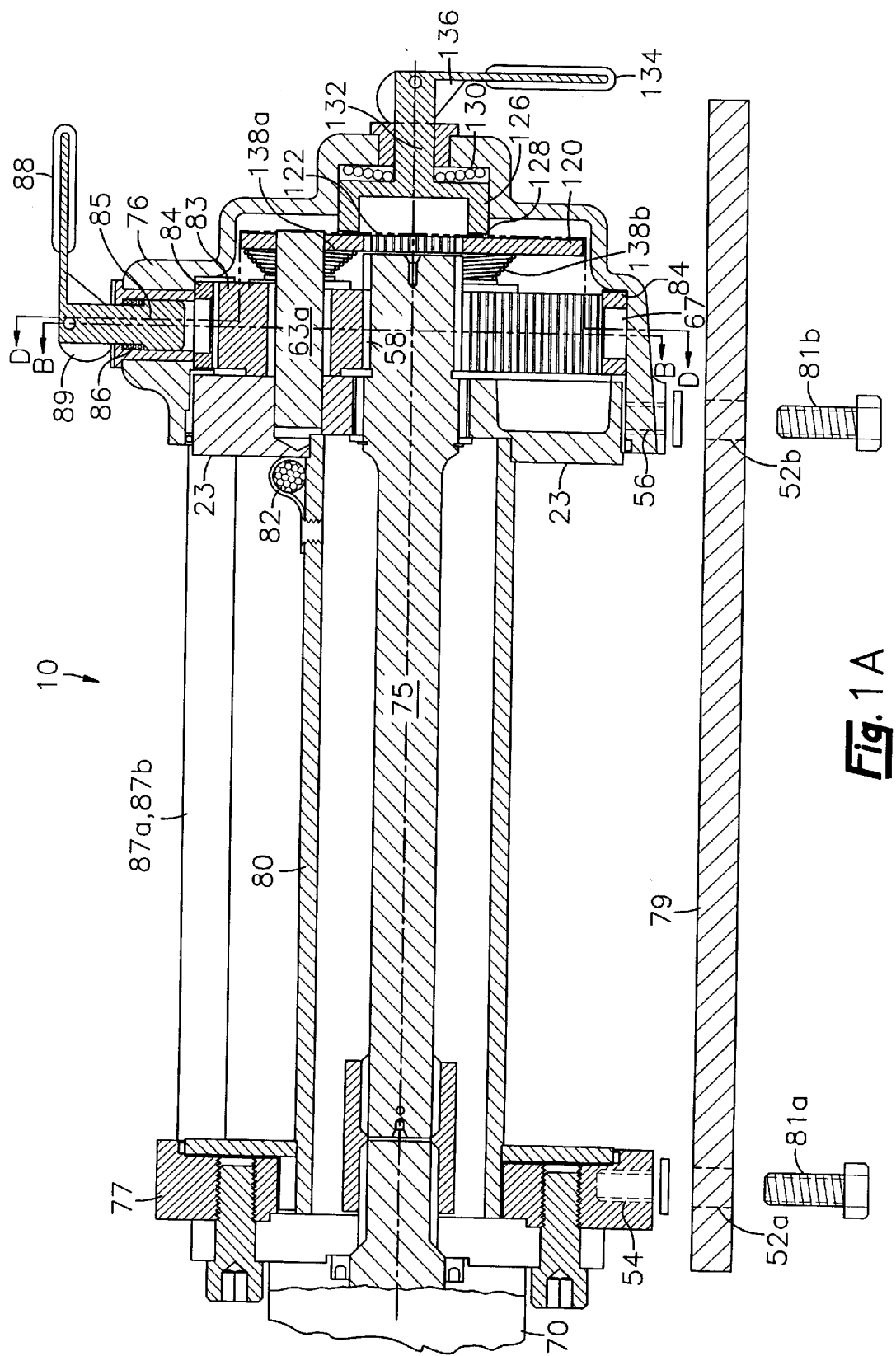
FIG. 1A is a cross-sectional view of a multi-speed winch which incorporates a single planetary gear assembly, and employs manual actuation of winch elements for selecting between the various modes of winch operation.
Figure 5:
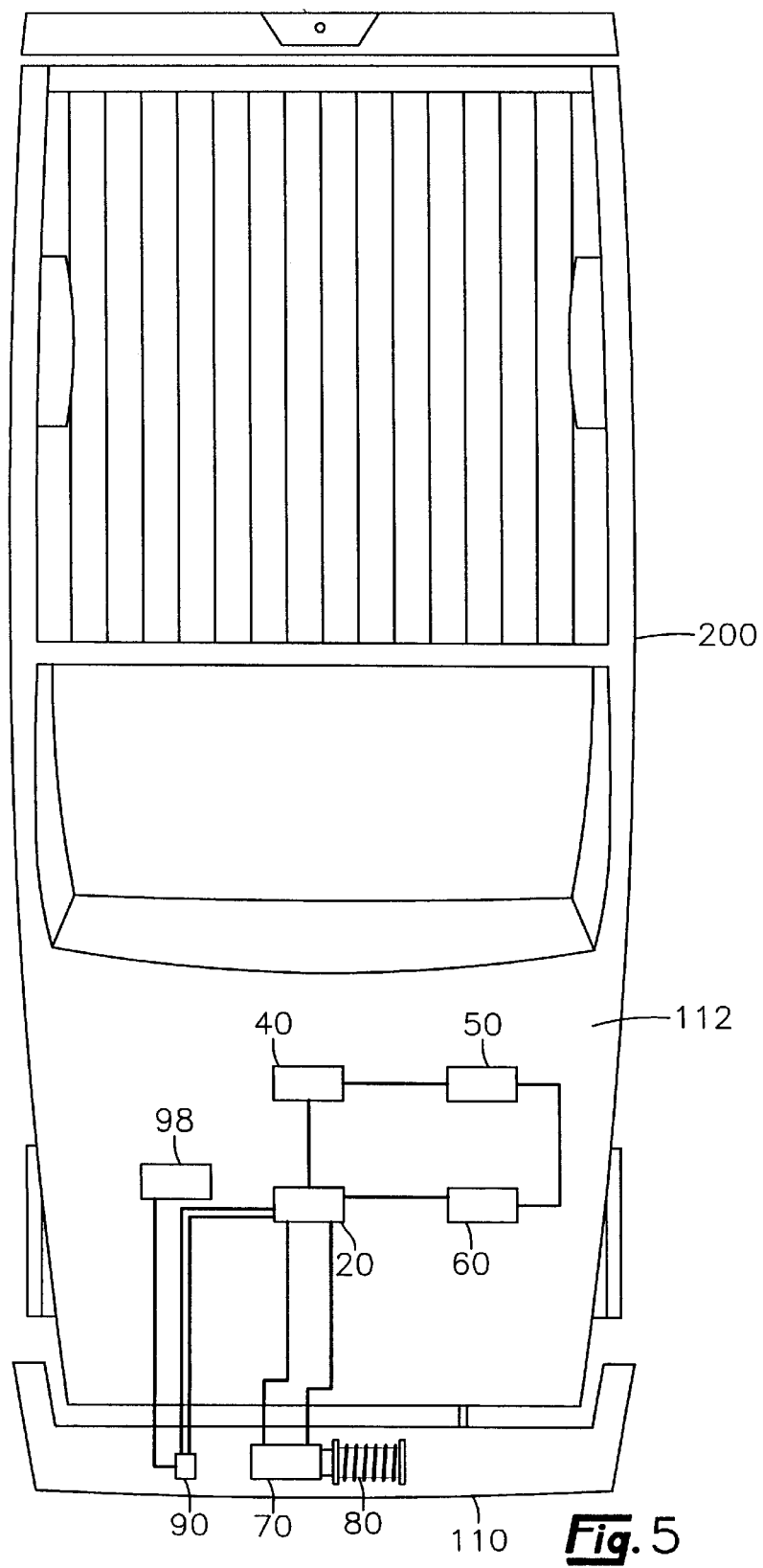
FIG. 5 is a diagram showing general vehicle installation features of the hydraulic winch.

A drive shaft 75, driven by a hydraulic winch motor 70 (FIG. 2), extends through the axial center of a winch drum 80 held in place by means of a left support 77 and a gear box housing 76. A mounting plate 79 provides a substrate on which the left support 77 and gear box housing 76 rest when attached to the host vehicle. Bolt holes in the mounting plate 79 (shown generally at 52a and 52b) align with threaded holes in the left support 77 (shown generally at 54), threaded holes in the gear box housing 76 (shown generally at 56), and holes in the host vehicle winch bumper 110 (FIG. 5). As shown in FIG. 1A, the left support 77 and gear box housing 76 are mounted to the base plate 79 and host vehicle by means of bolts shown generally as 81aand 81b.

The left support 77 and gear box housing 76 are connected near their tops by means of two tie rods 87a and 87b. Although two tie rods 87a and 87b are provided in the preferred embodiment, it will be understood that a single tie rod can be used instead. Further, it will be appreciated that when the tie rods 87a and 87b are removed, the left support 77, the gearbox housing 76, and the winch drum 80 are no longer connected and can be pulled apart freely, thereby simplifying maintenance. In other words, the winch drum 80 is effectively held in place and supported by the left support 77 and the gearbox housing 76 when the latter are connected by means of tie rods 87a and 87b.

The winch drum 80 is coupled to the drive shaft 75 via appropriate reduction gearing contained within the gear box housing 76 so that the drum 80 rotates in response to operation of the winch motor 70, thereby releasing cable 82 from the spool 80 as the winch motor 70 turns in a forward direction and retrieving cable 82 as the winch motor 70 turns in a reverse direction. Typical reduction gearing apparatuses and methods can be used to suitably couple the winch motor 70 and winch drum 80, and to provide sufficient torque output to the winch drum 80. In a preferred embodiment, the winch motor 70 is a low-speed, high-torque motor with 250 cc capacity. Suitable sources for such motors include White Hydraulics of Louisville, Ky. and the Dan Foss Company which is located in Wisconsin.

Figure 1B:
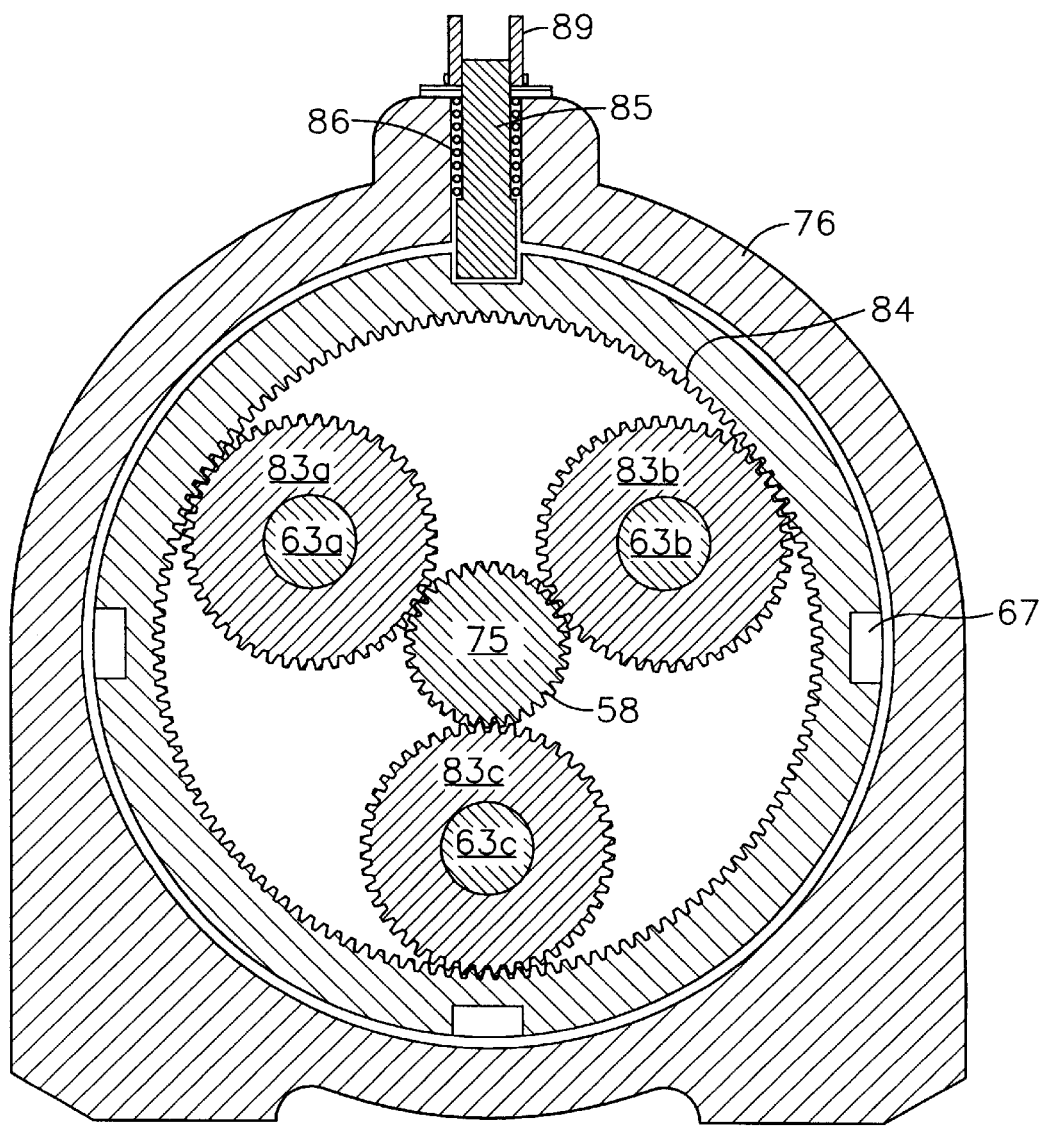
FIG. 1B is a breakaway view of the planetary gear assembly of FIG. 1A.
Figure 1C:
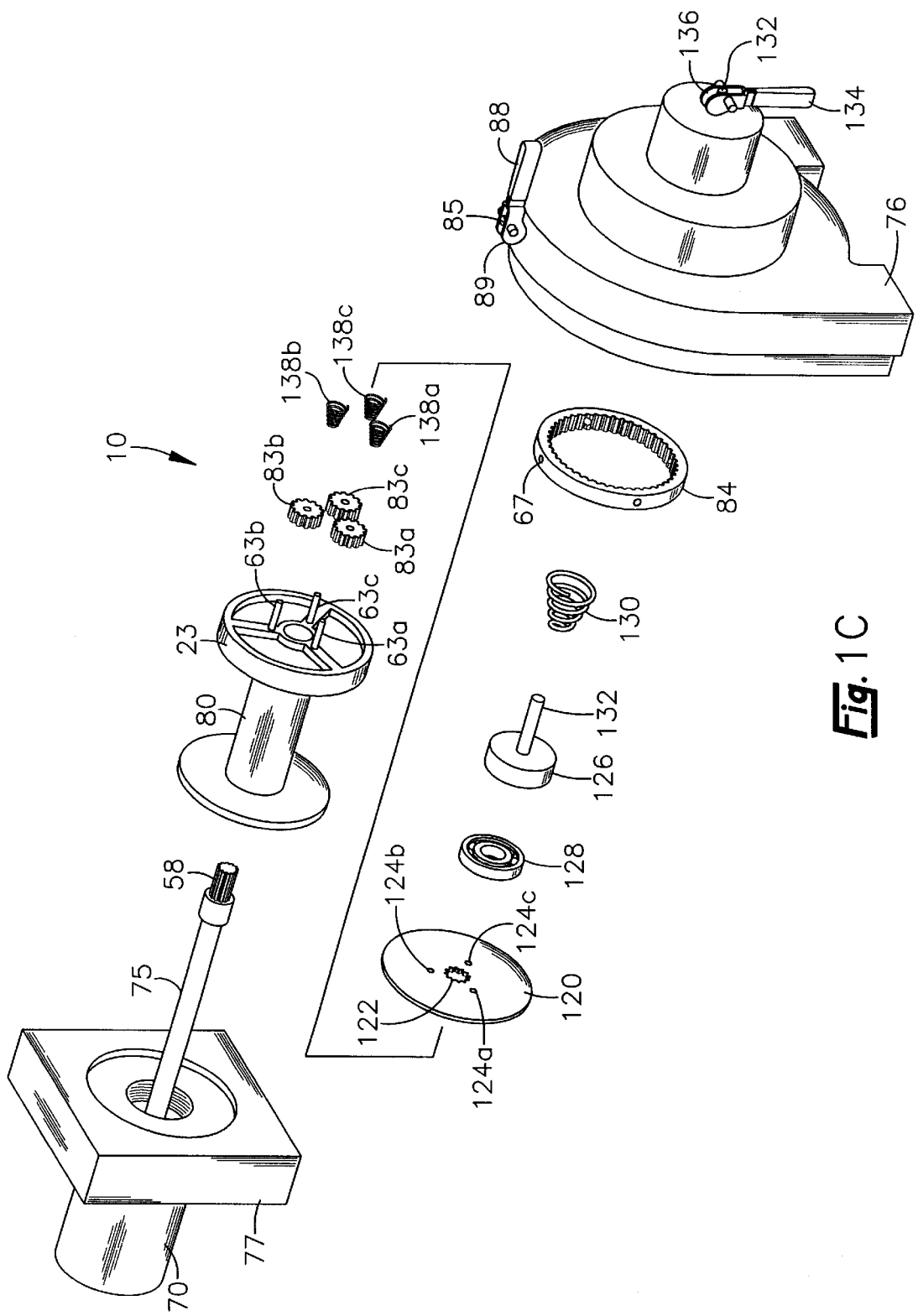
FIG. 1C is an exploded view of the multi-speed winch assembly.

However, a preferred reduction gearing apparatus is illustrated in FIGS. 1A–1C. The winch motor drive shaft 75 extends through the axial center of the winch drum 80 and engages an arrangement of three planet gears 83*a–c* which rotate upon three planet gear shafts 63*a–c*. As shown in FIG. 1A, one end of the planet gear shaft 63*a–c* attached to a drum drive plate 23. The planet gear shafts 63*a–c* are radially spaced at 120 degrees about the perimeter of the drum drive plate 23. The drum drive plate 23 is rigidly attached to the winch drum 80, such as by a weld. A spindle 58 on the end of the drive shaft 75 engages the planet gears 83*a–c* so that the planet gears 83*a–c* rotate in response to rotation of the drive shaft 75. A ring gear 84 meshes with the planet gears 83*a–c* so that when the ring gear 84 is locked to the gear box housing 76 by means of a gear reduction pin 85, rotation of the drive shaft 75 causes the winch drum 80 to rotate at a speed slower than that of the drive shaft 75. In a preferred embodiment, the gear reduction ratio achieved with this arrangement is six-to-one (6:1). However, it will be understood that other gear reduction ratios can be achieved with the gear reduction arrangement shown.

For a typical vehicle installation where the motor 70 is powered by the vehicle's power steering system, the power steering pump 40 (FIGS. 2 and 7) will supply hydraulic fluid to the motor 70 at a pressure of 1500 psi with a flow rate of three gallons per minute. This installation configuration produces a maximum torque of 10,500 ft lbs on the winch drum bottom wind and a nominal drum rotation rate of 8 rpm during winch motor operation. However, it will be understood that the maximum torque and nominal drum rotation rate will vary depending on the particular installation configuration as well as the particular gear reduction ratio employed.

The gear reduction pin 85 mechanically couples the ring gear 84 to the gear box housing 76 by means of detentes 67 along the outer surface of the ring gear 84 so that when the pin 85 is retracted, and thereby removed from the detentes 67, the ring gear 84 and planet gears 83 are drivingly decoupled from the winch drum 80. In other words, retracting the pin 85 from the ring gear 84 effectively decouples the winch motor drive shaft 75 from the winch drum 80 so that the winch drum 80 free-spools. In this manner, a free-spooling capability is disclosed whereby cable 82 may be unwound from the winch drum 80 without the assistance of the winch motor 70. This free-spooling capability is particularly useful for rapid removal of cable 82 from the winch drum 80.

In a preferred embodiment, the gear reduction pin 85 is urged toward the ring gear 84 by a spring 86. To disengage the pin 85 from the ring gear 84, the pin 85 is pulled in a radial direction away from the ring gear 84 by the rotation of a cam 89 to which the pin 85 is attached. This condition is illustrated in FIG. 1A. The cam 89 is rotated by means of a gear reduction selector handle 88 so that the winch drum 80 can be made to free-spool (as further described below) when the gear reduction selector handle 88 is in the position shown in FIG. 1A. When the gear reduction selector handle 88 is rotated 180 degrees counter-clockwise from the position shown in FIG. 1A, the ring gear 84 is locked to the housing 76, thus disabling free-spool operation.

Figure 6:
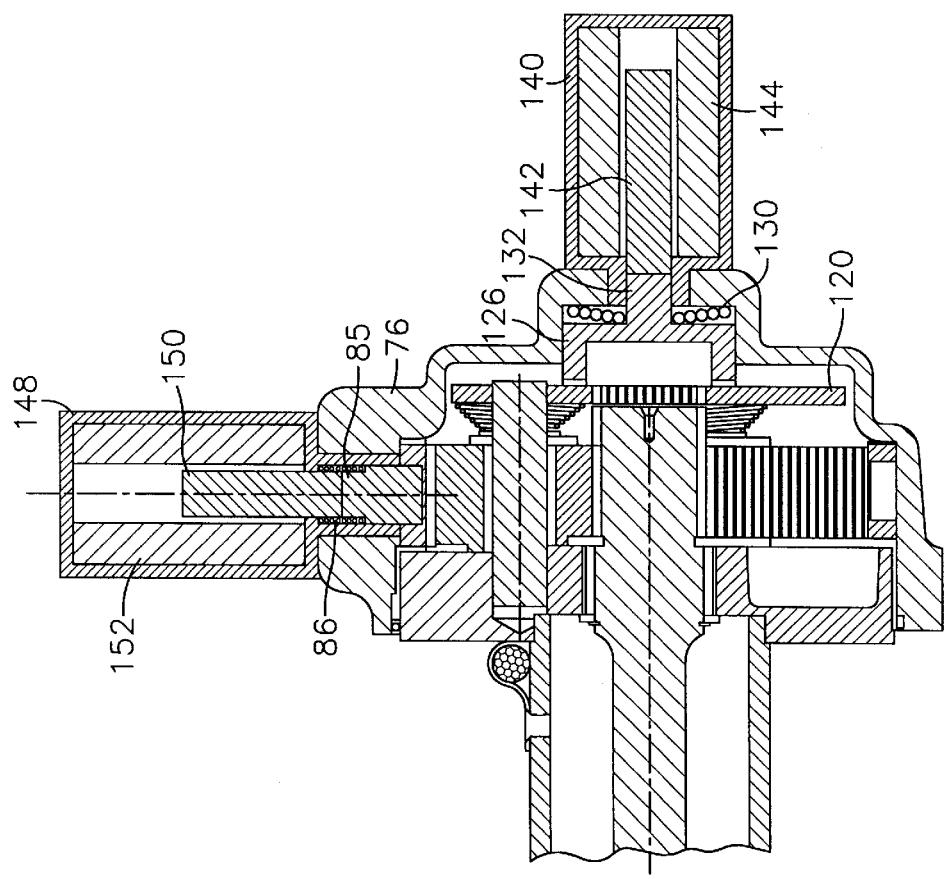
FIG. 6 is a cross-sectional view of the winch of FIG. 1A, employing solenoid actuation of winch elements for selecting between the various modes of winch operation

An alternative embodiment of the invention with a solenoid-activated gear reduction pin is shown in FIG. 6. In this embodiment, the gear reduction pin 85 is retracted from the detent 67 in the ring gear 84 using a gear reduction solenoid 148 which is attached to the gear box housing 76. When the solenoid coil 152 is energized, the armature 150 and the gear reduction pin 85, which is connected to the armature 150, are moved radially away from the ring gear 84. As a result, the gear reduction pin 85 is disengaged from the detent 67 in the ring gear 84 so that the ring gear 84 can be made to rotate freely within the gear box housing 76.

The winch drum may be driven in a high-speed, low-torque mode by coupling the rotation of the drive shaft 75 directly to the winch drum 80 with no gear reduction. A higher drum rotation speed is useful in retrieving long lengths of unspooled cable 82 after load-moving operations are complete, or in taking up slack in the cable 82 prior to moving a load. The coupling of the drive shaft 75 to the winch drum 80 is attained by means of a coupling plate 120 which is moveable between two axial positions: a low-speed position in which the winch drum 80 is decoupled from the drive shaft 75, and a high-speed position in which the winch drum is coupled to the drive shaft 75. For the exemplary vehicle installation described above (1500 psi at three gallons per minute), the direct drive arrangement produces a nominal drum rotation rate of 48 rpm and a maximum torque of 1,750 ft lbs during winch motor operation.

Figure 1D:
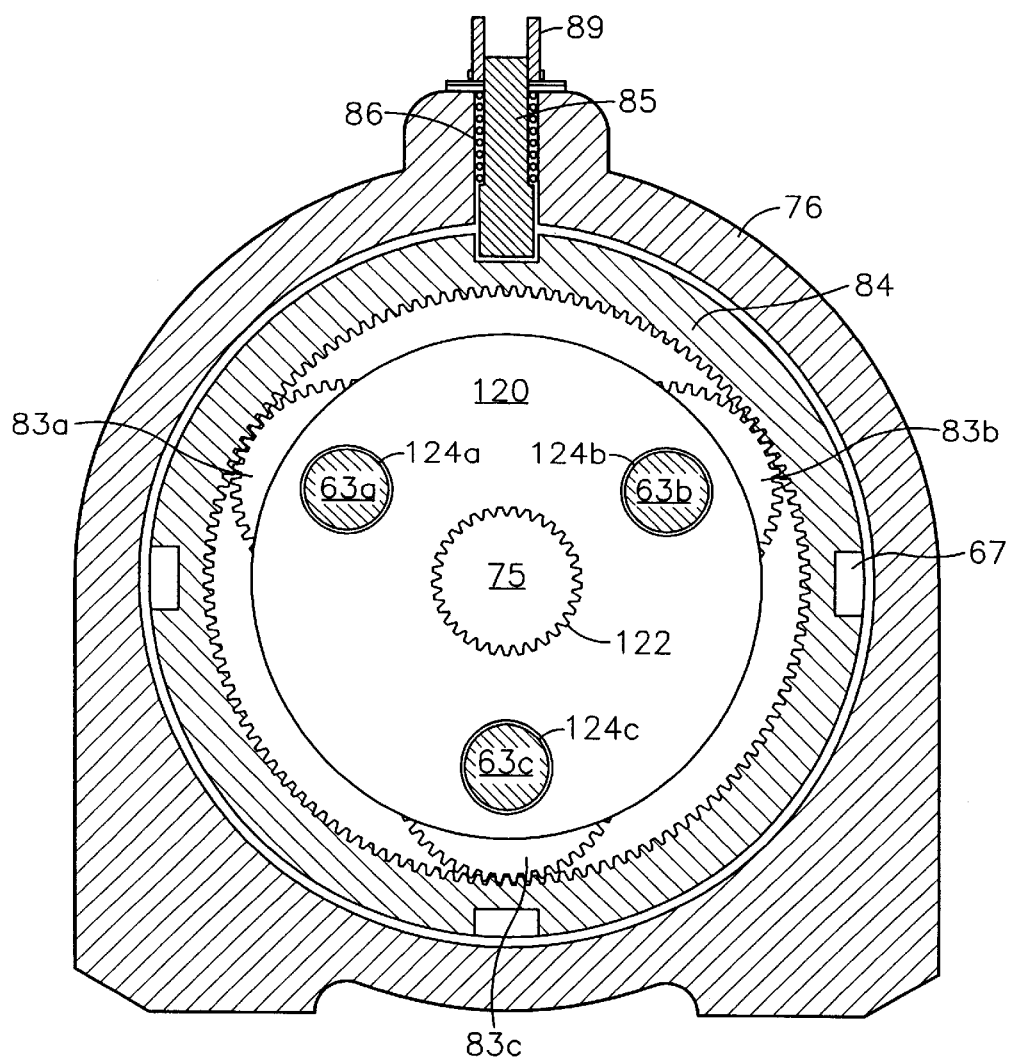
FIG. 1D is a breakaway view of the coupling plate and the planetary gear assembly of FIG. 1A.

As shown in FIG. 1D, the coupling plate 120 of the preferred embodiment is a circular plate with a keyed opening 122 at its center. The shape of the keyed opening 122 matches the spindle 58 at the end of the drive shaft 75. The coupling plate 120 also has three openings 124*a–c* which are radially spaced at 120 degrees about its perimeter. The position and spacing of these openings 124 match the position and spacing of the planet gear shafts 63 which extend from the drive drum plate 23. With this arrangement, the coupling plate 120 is connected to the winch drum 80 by engaging the planet gear shafts 63 in the openings 124. The openings 124 are of sufficient diameter for the coupling plate 120 to slide freely in an axial direction on the planet gear shafts 63.

With reference to FIG. 1A, as the coupling plate 120 slides toward the drive shaft 75 due to the force applied by piston spring 130, the keyed hole 122 in the coupling plate 120 engages the spindle 58 at the end of the drive shaft 75, thus causing the coupling plate 120 to rotate at the same speed as the drive shaft 75. In this manner, the drive shaft 75 is directly coupled to the winch drum 80 through the coupling plate 120 and the planet gear shafts 63. The piston spring 130 also allows for misalignment between the spindle 58 and the keyed hole 122 by holding the coupling plate 120 against the spindle 58 until proper alignment is achieved through rotation of the spindle or otherwise. As the coupling plate 120 slides toward the drive shaft 75, if misalignment between the keyed hole 122 and spindle 58 occurs the piston spring 130 will hold the coupling plate 120 against the drive shaft 75 until there is proper alignment. In this manner, the piston spring 130 helps compensate and correct for initial improper alignment.

It will be appreciated that high-speed operation of the winch 10 is achieved only when the gear reduction pin 85 is retracted. In such a position, the pin 85 does not engage a detent 67 in the ring gear 84, and the ring gear is free to rotate along with winch drum 80. If the pin 85 is engaged in a detent 67 in the ring gear 84, then, due to the meshing of the planet gears 83 with the ring gear 84 and the coupling of the drive shaft 75 to the planet gear shafts 63 by means of the coupling plate 120, no rotation of the ring gear 84 or the drive shaft 75 may occur. In other words, when the pin 85 is engaged with a detent 67, and the coupling plate 120 is engaged with the drive shaft 75, the winch drum 80 is in a locked position.

Although there are many mechanisms which can be employed to move the coupling plate 120 in an axial direction to engage or disengage the drive shaft 75, FIGS. 1A and 1C show the mechanism of a preferred embodiment. To move the coupling plate 120 toward the drive shaft 75, a piston spring 130 which is in compression between a piston 126 and the gear box housing 76 pushes the piston 126 against the coupling plate 120. The coupling plate keyed hole 122 engages the spindle 58 as soon as the two are in alignment. A roller bearing 128 positioned between the coupling plate 120 and the piston 130 enables the coupling plate 120 to rotate freely relative to the piston 126 as the piston pushes against the roller bearing 128. A set of three coupling plate springs 138a–c, which are in compression between the coupling plate 120 and the planet gears 83a–c, push the coupling plate 120 against the bearing 128 and piston 126 so that the coupling plate 120 maintains continuous contact with the bearing 128. The moduli of the coupling plate springs 138a–c is less than that of the piston spring 130 so that, with no other axial force applied to the piston 126, the coupling plate 120 will be forced into engagement with the drive shaft 75.

To disengage the coupling plate 120 from the drive shaft 75, a piston rod 132 connected to the piston 126 is forced away from the drive shaft 75 by the rotation of a cam 136 to which the piston rod 132 is attached. As the piston 126 is forced away from the drive shaft 75, the piston spring 130 becomes compressed and the keyed hole 122 and spindle 58 disengage. This condition is illustrated in FIG. 1A. The cam 136 is rotated by means of a direct drive handle 134.

The winch operator may select from four different modes of winch operation depending upon the positions of the gear reduction selector handle 88 and the direct drive selector handle 134. Low-speed winch operation is selected when the direct drive selector handle 134 is in the position shown in FIG. 1A and the gear reduction selector handle 88 is rotated 180 degrees counter-clockwise from the position shown in FIG. 1A. High-speed winch operation is selected when the direct drive selector handle 134 is rotated 180 degrees counter-clockwise from the position shown in FIG. 1A and the gear reduction selector handle 88 is in the position shown in FIG. 1A. Free-spool winch operation is selected when the direct drive selector handle 134 and the gear reduction selector handle 88 are both in the positions shown in FIG. 1A. The winch is locked/braked (no dram rotation) when the direct drive selector handle 134 and the gear reduction selector handle 88 are both rotated 180 degrees counter-clockwise from the positions shown in FIG. 1A.

Figure 2:
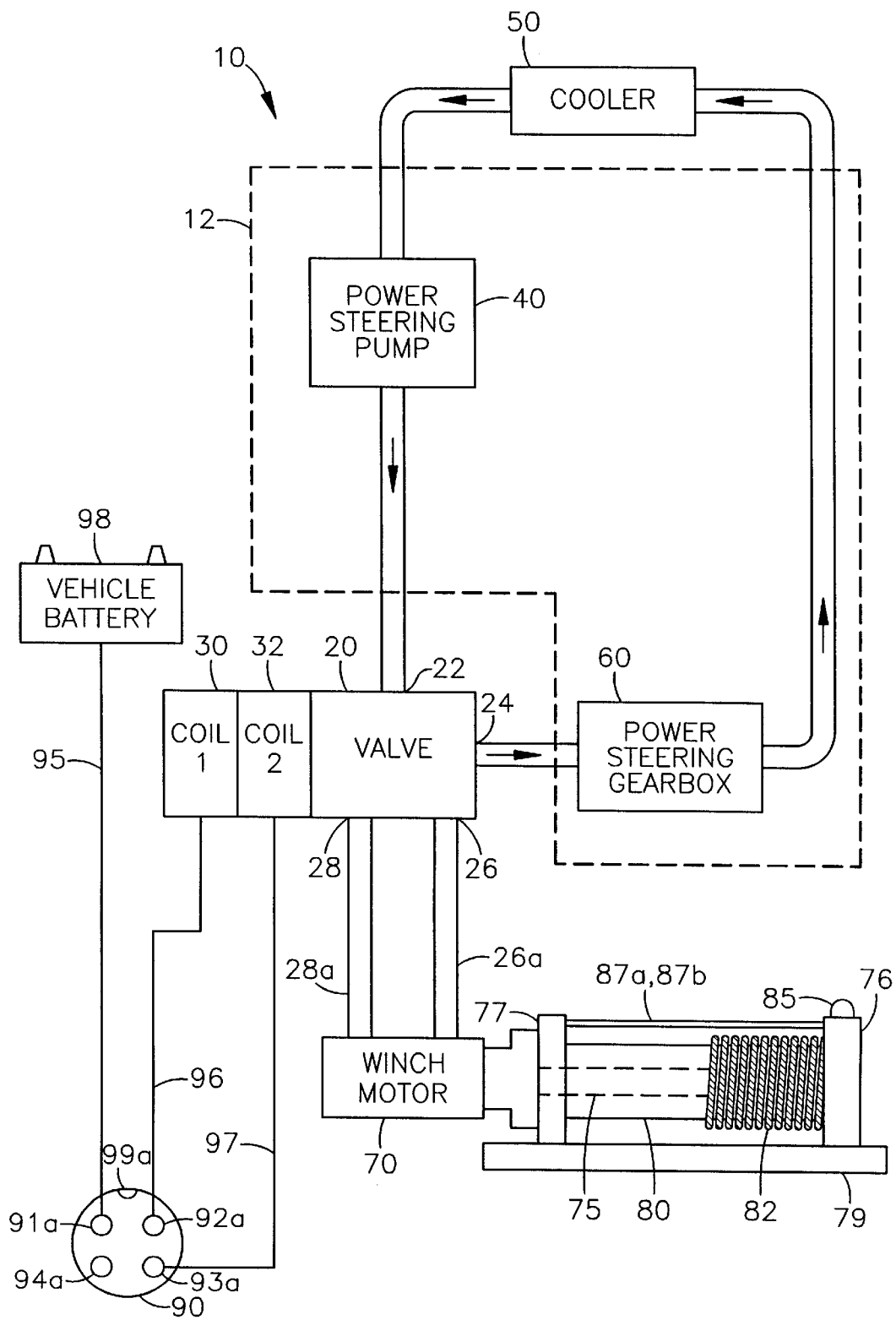
FIG. 2 is a schematic diagram of the winch of FIG. 1A installed in a vehicle having a hydraulic power system.

As illustrated in FIG. 2, the winch 10 utilizes the host vehicle's hydraulic pressure supply to drive the winch motor 70. Preferably, the vehicle's power steering system 12 is utilized to provide hydraulic pressure for operation of the winch motor 70. However, it will be understood that other sources of hydraulic pressure, if available, can be utilized.

Power steering systems vary in design, but a typical system incorporates at least a power steering pump 40 and a power steering gearbox 60, or some equivalent thereof. Typical power steering pumps produce a flow rate of between two to four gallons per minute with pressure ranges between 1200 psi to 1500 psi. A hydraulic valve 20 is connected to the vehicle's power steering system 12 between the power steering pump 40 and the power steering gearbox 60. Typical automobile hydraulic steering pumps have an output capacity of 4 gallons per minute at a pressure of 1500 psi. The winch motor 70 is connected to the valve 20 via high pressure hydraulic conduit 26a and 28a. High pressure hydraulic fluid, diverted from the power steering system 12 by the valve 20, turns the drive shaft 75 of the winch motor 70 in either a forward or reverse direction.

Figure 3A:
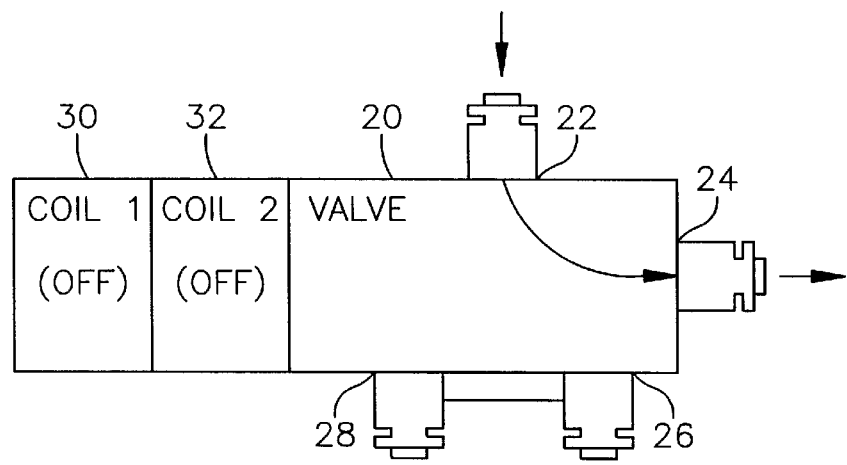
FIG. 3A is a functional diagram of a hydraulic valve with coils 1 and 2 de-energized.

In a preferred embodiment, the valve 20 is a HYDRAFORCE® SV10-47A four-way, three-position, tandem center, solenoid-operated valve and enables simultaneous operation of the winch motor 70 and power steering gearbox 60. The valve 20 is operated by means of two electrical coils 30 and 32, each having an energized and a de-energized state. When both coils 30 and 32 are in a de-energized state, hydraulic fluid flows directly from the power steering pump 40 to the power steering gearbox 60 with no hydraulic fluid flow to the winch motor 70. FIG. 3A functionally illustrates the flow of hydraulic fluid through the valve 20 when both coils 30 and 32 are de-energized. Fluid flows from the power steering pump 40 and enters the valve 20 through port 22. The fluid then directly exits the valve 20 through port 24 where it flows to the power steering gearbox 60. When both coils 30 and 32 are de-energized, no fluid flows through ports 26 and 28, so that the valve 20 functions the same as a simple connector, connecting the power steering pump 40 to the power steering gearbox 60.

Figure 3B:
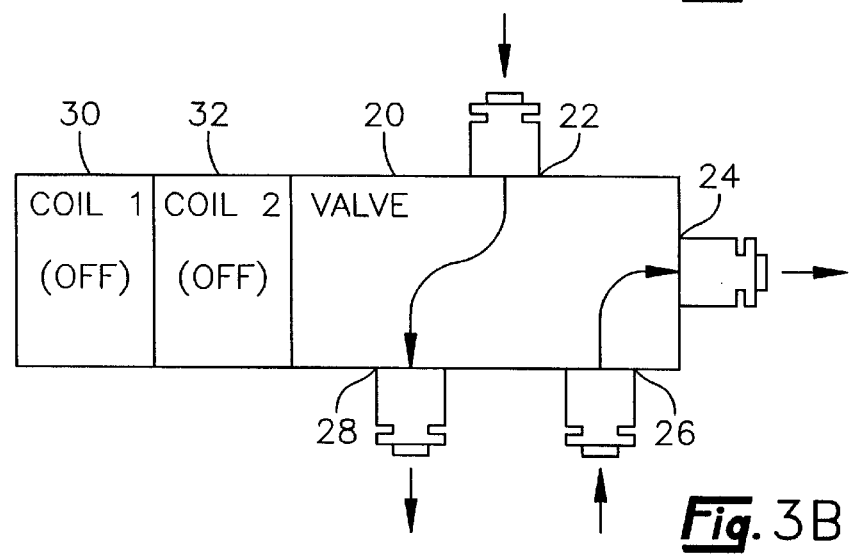
FIG. 3B is a functional diagram of the valve with coil 1 energized and coil 2 de-energized.

For an appropriately wound winch drum 80, cable 82 is released from the winch drum 80 by energizing coil 30. FIG. 3B illustrates the flow of hydraulic fluid through the valve 20 when coil 30 is energized. With coil 30 energized, high pressure hydraulic fluid from the pump 40 enters the valve 20 through port 22 and exits the valve 20 through port 28 where it flows to the winch motor 70. High pressure hydraulic fluid flowing through this path acts on the winch motor 70 to turn it in a forward direction, thereby releasing cable 82 as the winch drum 80 rotates. Hydraulic fluid returns from the winch motor 70 and re-enters the valve 20 through port 26. Fluid returning through port 26 exits the valve 20 through port 24 where it flows to the gearbox 60. This return flow from the winch motor 70 maintains sufficiently high pressure to enable operation of both the winch motor 70 and the gearbox 60 when coil 30 is energized. In this manner, the system 10 functions as a fail-safe hydraulic winch because even if coil 30 were to fail in an energized state, the failure would not affect vehicle safety or performance. In other words, the vehicle's power steering system 12 would continue to function safely even if coil 30 were inadvertently energized to continuously supply hydraulic pressure to the winch motor 70. As a further measure of fail-safe protection, a spring (not shown) within the valve returns the valve ports 22–28 to their de-energized positions in the event of electrical power loss to the coils 30 and 32.

Figure 3C:
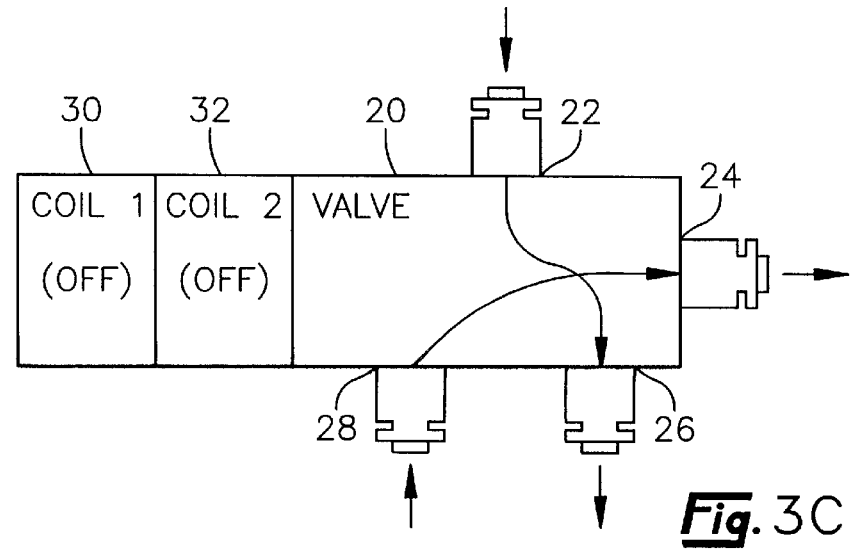
FIG. 3C is a functional diagram of the valve with coil 1 de-energized and coil 2 energized.

Cable 82 is retrieved onto the winch drum 80 by energizing coil 32. FIG. 3C illustrates the flow of hydraulic fluid through the valve 20 when coil 32 is energized. With coil 30 32 energized, hydraulic fluid follows a different path through the valve 20. This path consists of high pressure hydraulic fluid flowing from the power steering pump 40, entering the valve 20 through port 22, and exiting the valve 20 through port 26. After exiting through port 26, the fluid acts upon the winch motor 70 to turn it in a reverse direction so that cable 82 on the winch drum 80 is reeled in. Hydraulic fluid returns from the winch motor 70 and re-enters the valve 20 through port 28 where it then exits the valve 20 at port 24 with sufficient pressure to act upon the power steering gearbox 60. Therefore, the flow of hydraulic fluid from valve 20 to winch motor 70 and then back to valve 20 is exactly reversed from the direction of flow created when coil 30 is energized.

Referring again to FIG. 2, low pressure hydraulic fluid exiting the gearbox 60 enters a cooler 50 where the hydraulic fluid is cooled. The cooled hydraulic fluid then exits the cooler 50 and enters the power steering pump 40 for repressurization. The cooler 50 is not innate to the vehicle's power steering system 12 and is generally required only during operation of the winch motor 70 as an added measure of protection to the power steering system 12 and winch motor 70. However, once installed, the cooler 50 functions continuously to cool the hydraulic fluid while the vehicle's engine is operating, thereby providing an extra level of protection for the power steering system 12.

Electrical power to energize coils 30 and 32 is provided by the vehicle's battery 98. As shown in FIG. 2, an electrical connection 95 extends from the battery 98 to a recessed four-pin male connector 90 where it is connected to pin 91*a*. Line 96 electrically connects coil 30 to pin 92*a*, and line 97 electrically connects coil 32 to pin 93*a* of the male connector 90. In this preferred embodiment, pin 94*a* is unused.

FIG. 6 illustrates an alternative embodiment of the invention in which the gear reduction pin 85 and the direct drive piston rod 132 are actuated by solenoids 148 and 140, respectively. Electrical power to energize the solenoid coils 152 and 144 (FIG. 6) is also provided by the vehicle's battery 98. An electrical connection 95 extends from the battery 98 to a recessed male connector 90 where it is connected to pin 91*a*. In this embodiment, male connector 90 is provided with five pins, with pins 91*a*, 92*a*, and 93*a* configured as described above. A line 154 electrically connects the gear reduction solenoid 148 to pin 156*a*, and a line 146 electrically connects the direct drive solenoid 140 to pin 94*a* of the male connector 90.

As FIG. 5 illustrates, the male connector 90 is mounted to a standard winch bumper 110 to enable easy access from outside the vehicle 200. Although the connector 90 may be either male or female, a male connector is preferred for this use because male connectors are generally more tolerant of exposure to dirt, water, and other natural elements. As a further measure of protection, the pins of connector 90 are preferably recessed from the edge of the bumper 110 and protected from the elements by a standard flip cover (not shown) attached to the bumper 110. Alternatively, connector 90 may be mounted at any easily accessible point on the vehicle 200, including the vehicle's interior.

Referring again to the installation of FIG. 5, a preferred method of mounting the winch motor 70 and winch drum 80 is illustrated. Just as the system 10 utilizes the host vehicle's existing power steering system 12 and battery 98 to enhance efficiency and useability while reducing parts and costs, installation of the winch motor 70 and winch drum 80 is likewise enhanced by utilizing standard mounting equipment when possible. A standard winch bumper 110 provides a level platform for mounting these components, but it will be appreciated that the winch motor 70 and winch drum 80 may instead be mounted in the vehicle's engine compartment 112 with appropriate mounting provisions. Standard four-hole bolt patterns (not shown) for mounting existing electrical winches are preferably utilized to mount the motor 70 and winch drum 80 to the bumper 110.

Figure 4:
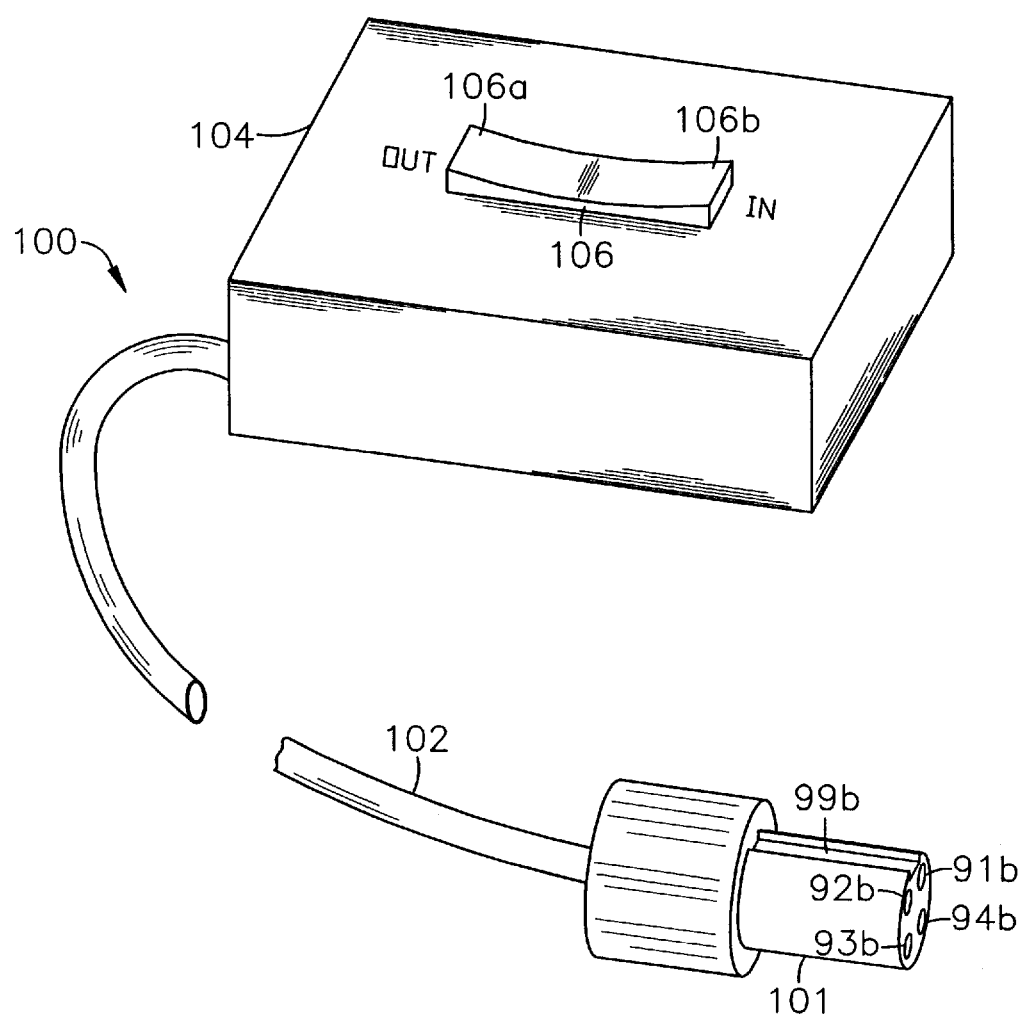

In the embodiments of FIGS. 1A–D and 2, electrical continuity between the battery 98 and the coils 30 and 32 is selectively established via the remote switch assembly 100 shown in FIG. 4. In an alternative embodiment, winch controls may be hard-mounted to the interior of the vehicle. Additionally, it will be appreciated that the winch assembly may be operated by wireless remote control. The remote switch 100 is attached to the recessed male connector 90 at the vehicle's bumper by means of a female connector 101. The female connector 101 is preferably keyed 99*a* to match the key 99*b* in the male connector 90, thus ensuring proper alignment of the pins 91*a*, 92*a*, and 93*a* of the male connector 90 with the receptacles 91*b*, 92*b*, and 93*b* of the female connector 101. When properly aligned, pin 91*b* is inserted into receptacle 91*b*, pin 92*a* is inserted into receptacle 92*b*, and pin 93*a* is inserted into receptacle 93*b*.

The controller 104 of FIG. 4 is provided with a rocker switch 106 which is electrically connected to the female connector 101 via an extended length of electrical cord 102 so that as the rocker switch 106 is depressed to the "OUT" position 106*a*, continuity is established between the vehicle battery 98 and coil 30, thereby releasing cable 82 from the winch drum 80. When the rocker switch 106 is depressed to the "IN" position 106*b*, continuity is established between the vehicle battery 98 and coil 32, thereby retrieving cable 82 onto the winch drum 80.

Figure 7:
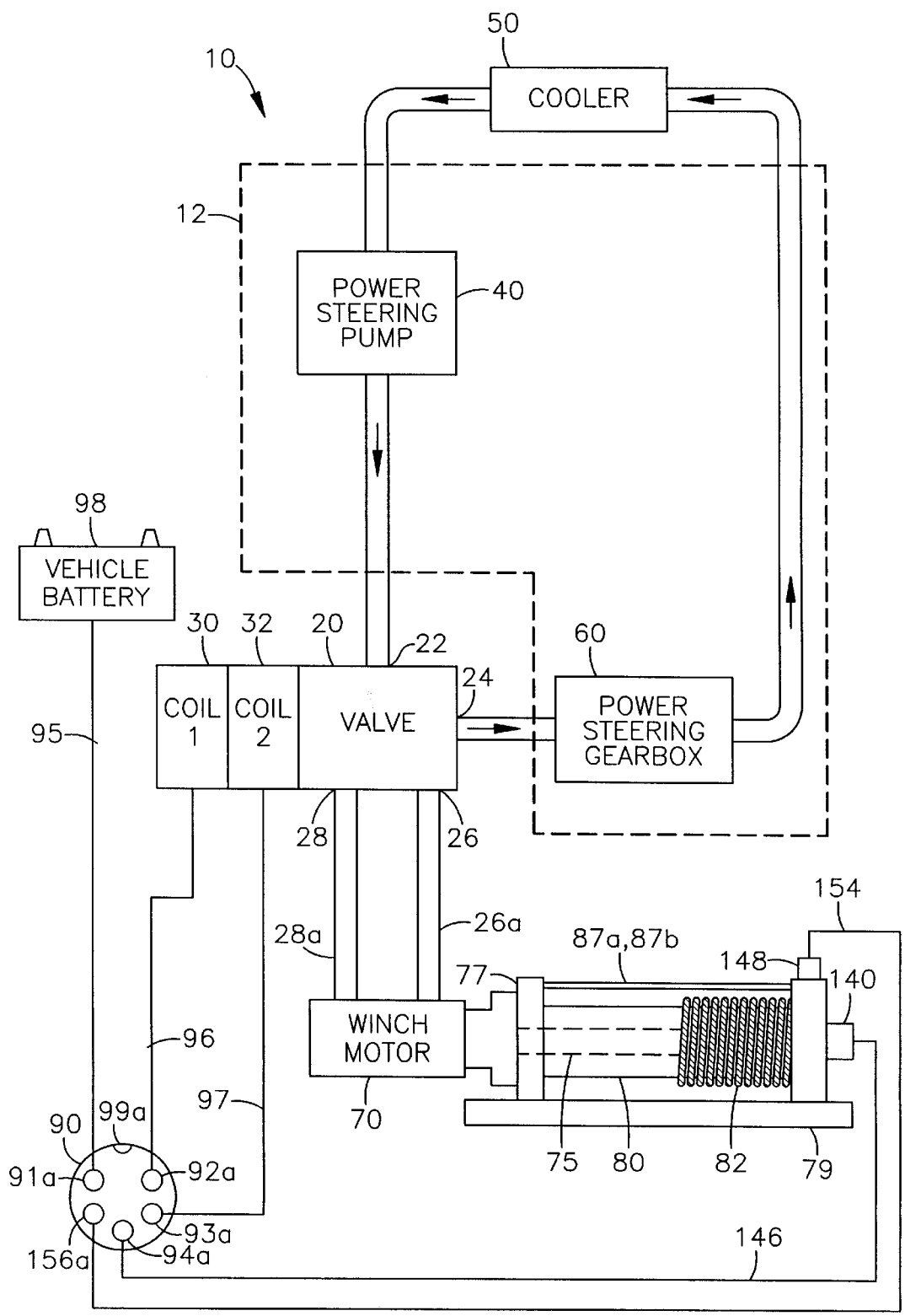
FIG. 7 is a schematic diagram of the winch of FIG. 6 installed in a vehicle.
Figure 8:
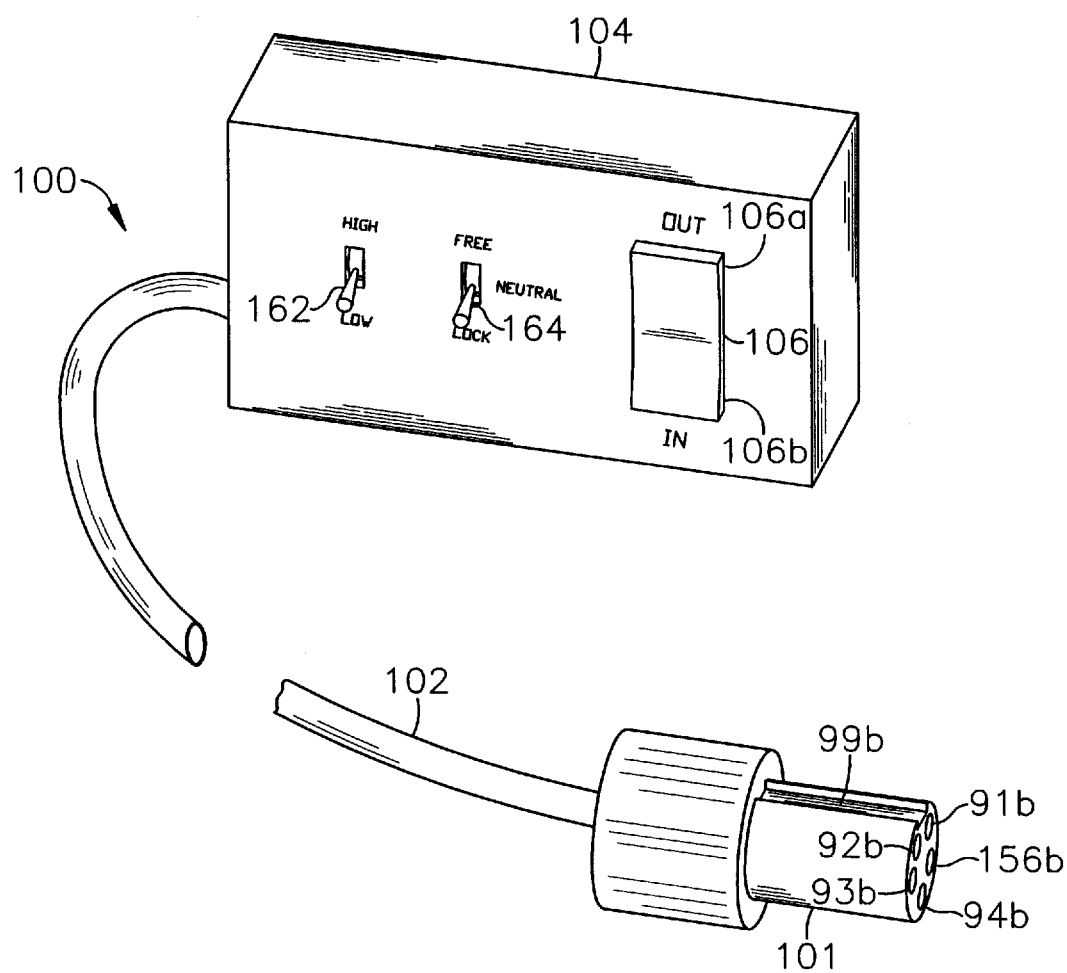
FIG. 8 is a diagram of a preferred embodiment of a remote controller for the winch of FIGS. 6 and 9.
Figure 9:
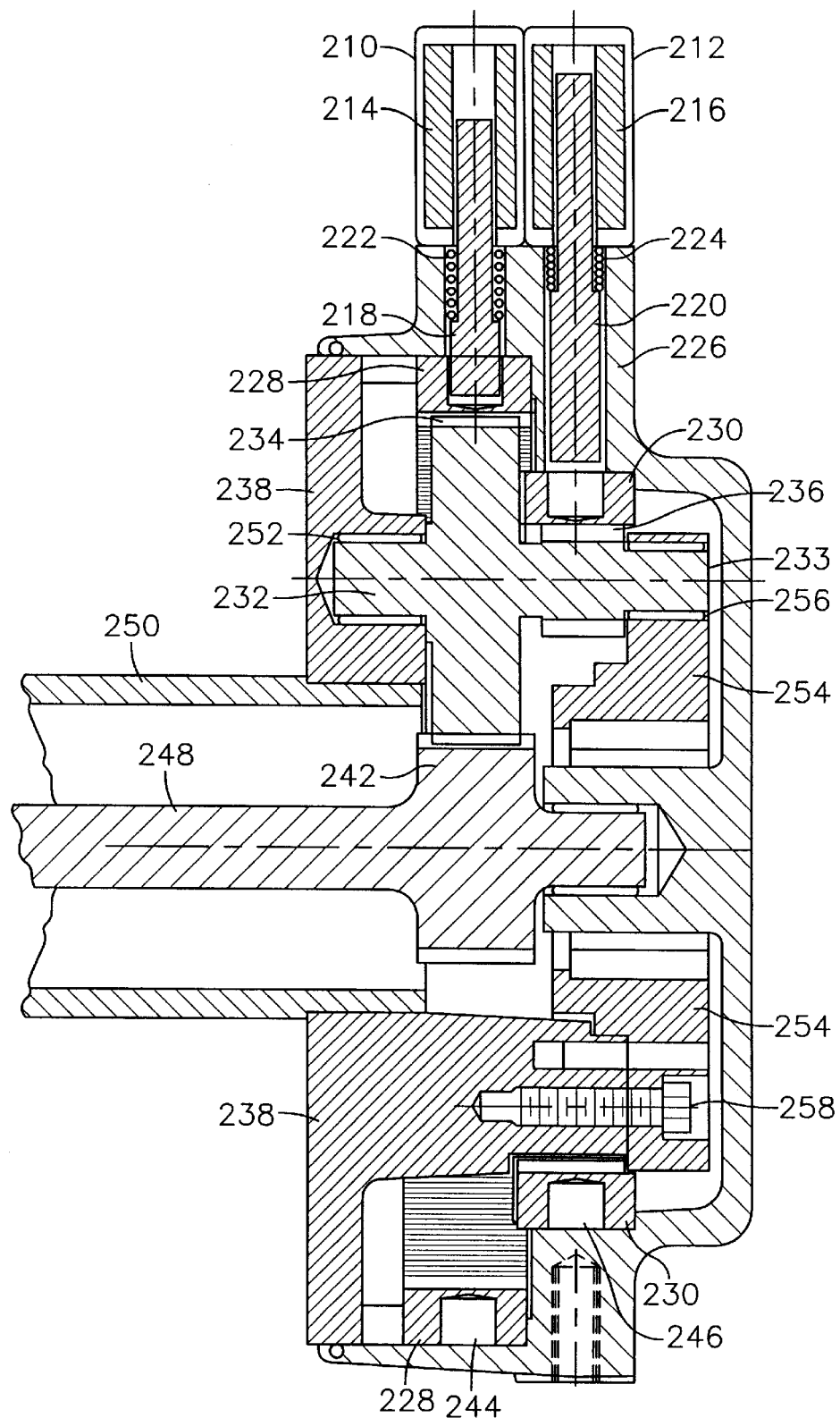
FIG. 9 is a cross-sectional view of an alternate embodiment of the multi-speed winch which incorporates dual planetary gear assemblies with solenoid actuation of winch elements for selecting between the various modes of winch operation.

In the alternative embodiments of FIGS. 6, and 7, where the gear reduction pin 85 and the direct drive piston rod 132 are solenoid actuated, and in the solenoid operated configuration of FIG. 9, a preferred embodiment of the remote switch assembly 100 is as shown in FIG. 8. Here, in addition to the pin/receptacle configuration described above (91–93), pin 94*a* is inserted into receptacle 94*b*, and pin 156*a* is inserted into receptacle 156*b*.

The controller 104 shown in FIG. 8 enables the operator to select among all modes of winch operation. Two toggle switches 162 and 164 are provided for the operator to select the desired mode. Speed selection toggle switch 162 is a two-position toggle switch which enables the operator to switch between high and low-speed winch operation, and toggle switch 164 is a three-position toggle switch which enables the operator to switch between locked, free-spooling, and neutral. Switch 164 is placed in the "FREE" position for free-spooling mode, and the switch 164 is placed in the "LOCK" position to lock the winch drum 80. "NEUTRAL" position enables the winch to be driven in high or low speed, depending on the position of switch 162. A rocker switch 160 is depressed to the "OUT" position 160*a* to release cable 82 from the winch drum 80 in accordance with the desired mode. Depressing rocker switch 160 to the "IN" position 160*b* retrieves cable according to the mode selected. The controller 104 contains the necessary logic circuitry to effect the desired winch operation based on the positions of the three switches 106, 162, and 164.

For example, considering the embodiment of FIG. 7, to release cable 82 from the winch drum 80 in low-speed mode, switch 162 is placed in the position labeled "LOW" while switch 164 is placed in the "NEUTRAL" position. This configuration of the toggle switches 162, 164 results in loss of electrical continuity between the vehicle battery 98 and gear reduction solenoid 148 so that gear reduction pin 85 is forced into its extended position, while continuity is provided to direct drive solenoid 140 so that coupling plate 120 is disengaged from the drive shaft spindle 58, as previously described. Thus, with the ring gear 84 locked and the coupling plate 120 disengaged, cable is released at low speed by depressing and holding switch 160 at the "OUT" position 160*a*. Similarly, cable is retrieved at low-speed by holding switch 160 at the "IN" position 106*b*.

To release or retrieve cable at high-speed, toggle switch 162 is placed in the "HIGH" position, and toggle switch 164 is placed in the "NEUTRAL" position. In this configuration, the gear reduction pin 85 is retracted to unlock the ring gear 84, while coupling plate 120 engages the drive shaft spindle 58.

In operation, the winch operator is typically positioned outside the vehicle to provide the operator with an unobstructed view. The extended cord 102 enables the operator to maintain a safe distance while operating the winch. It will be understood that the winch can also be operated with the winch operator positioned inside the vehicle. With the vehicle's engine operating to provide power to the power steering system 12, the operator simply depresses the rocker switch 106 to the desired position and maintains pressure on the rocker switch 106 for the desired length of time. Cable 82 is unwound by depressing the rocker switch 106 to the "OUT" position 106a, and cable 82 is retrieved by depressing the rocker switch 106 to the "IN" position 106b. A safety feature of the remote switch 100 is that once the operator releases the rocker switch 106, continuity is broken between the vehicle battery 98 and the coils 30 and 32, thereby ceasing operation of the winch motor 70. Connecting the controller 104 to the vehicle by means of an extended length of cord 102, such as ten feet, enables the operator to maintain a safe distance during winch motor 70 operation.

A significant safety advantage of this remote switching approach is that it virtually eliminates the possibility of having electrical power inadvertently applied to the coils 30 and 32. Even if power is inadvertently applied, the system is fail-safe because the functioning of the power steering system 12 will not be adversely affected.

It will be understood that other types of valves having the capability of enabling simultaneous operation of the power steering gearbox 60 and winch motor 70 may be used in place of the SV10-47A. For example, it is contemplated that a valve having a single solenoid may be used; the single solenoid being capable of variably positioning the valve in response to variable levels of electrical excitation.

An alternative embodiment of the invention, shown in FIG. 9, incorporates a dual planetary gear assembly to achieve dual-speed winch operation. A spindle 242 at the end of a drive shaft 248 engages a set of three compound planet gears 232a–c. Each compound planet gear 232a–c consists of a large planet gear 234a–c, a small planet gear 236a–c, and a single planet gear shaft 233a–c which are rigidly connected so that the large planet gears 234a–c and the small planet gears 236a–c always rotate at the same rate. Preferably, the large planet gear 234a–c, the small planet gear 236a–c, and the planet gear shaft 233a–c are formed from a single continuous piece of material. Alternatively, the large planet gear 234a–c and small planet gear 236a–c are formed as a single part which rotates about planet gear shaft 233a–c, which is rigidly attached to the drum drive plate 238.

As shown in FIG. 9, the planet gear shafts 233a–c are rotatably attached at one end to a drum drive plate 238, and at the other end to a bearing plate 254. The bearing plate 254 is secured to the drum drive plate 238 by means of three bolts 258a–c, so that the compound planet gears 232a–c are captured between the drum drive plate 238 and the bearing plate 254. Roller bearings 252a–c and 256a–c enable the compound planet gears 232a–c to rotate freely relative to the drive drum plate 238 and the bearing plate 254. The compound planet gears 232a–c are radially spaced at 120 degrees about the perimeter of the drum drive plate 238. The drum drive plate 238 is rigidly attached to the winch drum 250, such as by a weld.

The large ring gear 228 meshes with the large planet gears 234a–c so that when the large ring gear 228 is locked to the gear box housing 226 by means of a high speed locking pin 218 and the small ring gear 230 is free to rotate relative to the gear box housing 226, the rotation of the drive shaft 248 causes the winch drum 250 to rotate at a speed slower than that of the drive shaft 248. The preferred embodiment of this gear reduction arrangement produces a 5-to-1 reduction in the winch drum rotational speed relative to the drive shaft rotational speed.

The small ring gear 230 meshes with the small planet gears 236a–c so that when the small ring gear 230 is locked to the gear box housing 226 by means of a low speed locking pin 220 and the large ring gear 228 is free to rotate relative to the gear box housing 226, the rotation of the drive shaft 248 causes the winch drum 250 to rotate at a second speed which is slower than that of the drive shaft 248. The preferred embodiment of this gear reduction arrangement produces a 10-to-1 reduction in the winch drum speed relative to the drive shaft speed.

The high speed locking pin 218 mechanically couples the large ring gear 228 to the gear box housing 226 by means of detentes 244 along the outer surface of the large ring gear 228. When the high speed locking pin 218 is retracted, and thereby removed from the detentes 244, the large ring gear 228 is free to rotate relative to the gear box housing 226. Similarly, the low speed locking pin 220 mechanically couples the small ring gear 230 to the gear box housing 226 by means of detentes 246 along the outer surface of the small ring gear 230. As shown in FIG. 9, when the low speed locking pin 220 is retracted, and thereby removed from the detentes 244, the small ring gear 230 is free to rotate relative to the gear box housing 226.

When both locking pins 218 and 220 are engaged with their respective ring gears 228 and 230, thus locking both ring gears 228 and 230 relative to the gear box housing 226, the winch spool 250 is in a locked condition. When both locking pins 218 and 220 are retracted from their respective ring gears 228 and 230, thus freeing both ring gears 228 and 230 to rotate relative to the gear box housing 226, the winch drum 250 is in a free-spool condition.

As shown in FIG. 9, the preferred method of moving the high and low speed locking pins 218 and 220 between their retracted and extended positions is by means of the solenoids 210 and 212, and the springs 222 and 224. When the solenoid coils 214 and 216 are energized, the pins 218 and 220 are retracted and the respective ring gears 228 and 230 are unlocked and free to rotate. When the solenoid coils 214 and 216 are deenergized, the springs 222 and 224 urge the pins 218 and 220 into their extended positions.

It is contemplated, and will be apparent to those skilled in the art from the preceding description and accompanying drawings that modifications and/or changes may be made in the embodiments of the invention. Accordingly, it is expressly intended that the foregoing description and accompanying drawings are illustrative of preferred embodiments only, not limiting thereto, and that the true spirit and scope of the present invention be determined by reference to the appended claims.

What is claimed is:

1. A variable speed winch comprising:

a housing;

a winch drum rotatably connected to said housing;

a drive shaft having opposed first and second ends;

a winch motor connected to rotate the second end of said drive shaft;

means for interconnecting said winch drum and the first end of said drive shaft so that said winch drum rotates in response to the rotation of said drive shaft, said means for interconnecting including high-speed means for driving said winch drum at a first speed and low-speed means for driving said winch drum at a second speed which is less than the first speed;

wherein said high-speed means include direct coupling means for connecting said drive shaft to said winch drum and causing said winch drum to rotate at a speed equal to the rotational speed of said drive shaft; and means for selecting between said high-speed means and said low-speed means.

2. The winch of claim 1 wherein said means for selecting includes spring control means for compensating for misalignment between the drive shaft and said means for interconnecting.

3. The winch of claim 1 wherein said low-speed means include gear reduction means for connecting said drive shaft to said winch drum and causing said winch drum to rotate at a rate which is less than the rate of rotation of said drive shaft.

4. The winch of claim 3 wherein said gear reduction means comprise a planetary gear assembly having:

a ring gear;

a plurality of planet gears for being driven by the first end of said drive shaft while in mesh with said ring gear; and a plurality of planet gear shafts about which said planet gears rotate, each of said planet gear shafts connected to said winch drum.

5. The winch of claim 4 wherein said high-speed means include direct coupling means for connecting said drive shaft to said winch drum, said direct coupling means including a coupling plate having opposed first and second sides, the coupling plate including:

a central opening through the center of the plate which is keyed for being driven by the first end of said drive shaft; and a plurality of peripheral openings positioned radially about the central opening, the number of peripheral openings being at least as great as the number of planet gear shafts and being in spaced-apart relation with said planet gear shafts so that each peripheral opening is positioned to receive a peripheral shaft.

6. The winch of claim 5 wherein said means for selecting between said high-speed and said low-speed means include means for moving the coupling plate between first and second axial positions relative to said drive shaft, the central opening of the coupling plate engaging the first end of said drive shaft when in the first axial position and disengaging the first end of said drive shaft when in the second axial position.

7. The winch of claim 6 wherein said means for moving said coupling plate between two axial positions include:

a piston having opposed first and second ends;

a piston spring in compression between the piston's second end and the inner surface of said housing, the piston spring urging the piston toward the coupling plate and drive shaft;

a bearing positioned between the piston's first end and the second side of the coupling plate, the bearing enabling free rotation of the coupling plate relative to the piston's first end;

means for moving said piston between a hold position corresponding to the second axial position of the coupling plate and a release position corresponding to the first axial position of the coupling plate; and a plurality of coupling plate springs in compression between the planet gears and the first side of said coupling plate, said coupling plate springs urging the coupling plate away from said drive shaft, the total of the coupling plate springs having a modulus less than the modulus of the piston spring.

8. The winch of claim 7 wherein said means for selecting includes:

a ring gear lock pin having an extended position and a retracted position so that the ring gear is locked when the ring gear lock pin is extended and the ring gear is unlocked when the ring gear lock pin is retracted; and means for moving said piston between its hold and release positions;

wherein said winch drum rotates at low-speed when said ring gear is locked and said piston is in its hold position, said winch drum rotates at high-speed when said ring gear is unlocked and said piston is its release position, said winch drum is locked when said ring gear is locked and said piston is in its release position, and said winch drum free-spools when said ring gear is unlocked and said piston is in its hold position.

9. The winch of claim 8 wherein said means for moving said piston includes a cammed lever adjacent the second end of said piston, said cammed lever being moveable between an engage position for moving the piston to its release position so that the coupling plate moves to its first axial position and engages the first end of said drive shaft, and a retract position for moving the piston to its hold position so that the coupling plate moves to its second axial position and disengages from the first end of said drive shaft.

10. The winch of claim 8 wherein said means for moving said piston includes:

a direct drive solenoid having energized and de-energized states, said solenoid connected to place said piston in its hold position when said solenoid is in an energized state and to place said piston in its release position when said solenoid is in a de-energized state; and a direct drive switch for selectively energizing and de-energizing said direct drive solenoid.

11. The winch of claim 8, further comprising means for moving said ring gear lock pin between its extended and retracted positions.

12. The winch of claim 11 wherein said means for moving said ring gear lock pin includes a cammed lever positioned to move the pin between its retract and extend positions according to the position of the lever.

13. The winch of claim 11 wherein said means for moving said ring gear lock pin includes:

a gear reduction solenoid having energized and de-energized states, said solenoid connected to place said lock pin in its retract position when said solenoid is in an energized state and to place said solenoid in its extend position when said solenoid is in a de-energized state; and a gear reduction switch for selectively energizing and de-energizing said direct drive solenoid.

14. A multi-speed hydraulic winch which derives hydraulic power from pressurized hydraulic fluid produced by the hydraulic steering system of a vehicle with a battery, said winch comprising:

a housing;

a winch drum rotatably connected to said housing;

a drive shaft having opposed first and second ends;

a winch motor connected to rotate the second end of said drive shaft;

means for interconnecting said winch drum and the first end of said drive shaft so that said winch drum rotates in response to the rotation of said drive shaft, said means for interconnecting including high-speed means for driving said winch drum at a first speed, and low-speed means for driving said winch drum at a second speed which is less than the first speed;

means for selecting between said high-speed means and said low-speed means;

a valve having a plurality of valve positions, said valve having an input port connected to the hydraulic steering system for continuously receiving hydraulic fluid and an output port connected to the hydraulic steering system for continuously sending hydraulic fluid to the hydraulic steering system, said valve controlling the flow of pressurized hydraulic fluid to said winch motor and continuously returning pressurized hydraulic fluid to the hydraulic steering system;

positioning means connected to said valve for placing said valve in a selected position; and a controller for selectively directing electrical power to said positioning means by an operator.

15. The hydraulic winch of claim 14, wherein said controller is further operable to selectively direct electrical power from the vehicle battery to said positioning means by an operator.

16. The hydraulic winch of claim 14, wherein said positioning means comprise:

a first electrical coil having energized and de-energized states and connected to said valve for producing a first valve position when said first electrical coil is in an energized state; and a second electrical coil having energized and de-energized states and connected to said valve for producing a second valve position when said second electrical coil is in an energized state.

17. The hydraulic winch of claim 16, wherein said controller further comprises:

a power input for receiving electrical power from the vehicle battery;

a first power output for providing electrical excitation to the first electrical coil, placing the first electrical coil in an energized state so that said winch motor turns in a first direction;

a second power output for providing electrical excitation to the second electrical coil, placing the second electrical coil in an energized state so that said winch motor turns in a second direction; and a switch for selectively routing electrical power received by the power input to the power outputs.

18. The hydraulic winch of claim 17, wherein the switch requires continuous depression by the operator to maintain electrical excitation to the first and second power outputs.

19. The hydraulic winch of claim 16, wherein said controller is detachably connectable to the vehicle battery and the first and second electrical coils.

20. The hydraulic winch of claim 16, wherein said valve is a four-port hydraulic valve comprising:

a first port connected to the vehicle's hydraulic steering system for continuously receiving pressurized hydraulic fluid from the vehicle's hydraulic steering system;

a second port connected to the vehicle's hydraulic steering system for continuously outputting pressurized hydraulic fluid to the vehicle's hydraulic steering system;

a third port connected to said winch motor for supplying pressurized hydraulic fluid to said winch motor when the first electrical coil is in an energized state; and a fourth port connected to said winch motor for supplying pressurized hydraulic fluid to said winch motor when the second electrical coil is in an energized state.

21. The hydraulic winch of claim 20, wherein the third and fourth ports function to alternately receive return hydraulic fluid from said winch motor and route it to the second port for output to the vehicle's hydraulic steering system.

22. The hydraulic winch of claim 14 further comprising a cooler connected to the hydraulic steering system for cooling the hydraulic fluid.

23. A multi-speed winch comprising:

a housing;

a winch drum rotatably connected to said housing;

a drive shaft having opposed first and second ends;

a winch motor connected to rotate the second end of said drive shaft;

direct drive means for connecting said winch drum to the first end of said drive shaft so that said winch drum rotates at the same speed as said drive shaft;

gear reduction means for connecting said winch drum to the first end of said drive shaft so that said winch drum rotates at a lower speed relative to said drive shaft; and means for switching between said gear reduction means and said direct drive means.

24. A variable speed winch comprising:

a housing;

a winch drum rotatably connected to said housing;

a drive shaft having opposed first and second ends;

a winch motor connected to rotate the second end of said drive shaft;

means for interconnecting said winch drum and the first end of said drive shaft so that said winch drum rotates in response to the rotation of said drive shaft, said means for interconnecting including high-speed means for driving said winch drum at a first speed, low-speed means for driving said winch drum at a second speed which is less than the first speed, and single spindle driven by the first end of said drive shaft for selectively driving said high-speed means and said low-speed means; and means for selecting between said high-speed means and said low-speed means.

25. The winch of claim 24 wherein said high-speed means include direct coupling means for connecting said drive shaft to said winch drum and causing said winch drum to rotate at a speed equal to the rotational speed of said drive shaft.

26. The winch of claim 24 wherein said high-speed means include gear reduction means for connecting said drive shaft to said winch drum and causing said winch drum to rotate at a rate which is less than the rate of rotation of said drive shaft and greater than the rate of rotation of said low-speed means.

27. The winch of claim 24 wherein said low-speed means and said high-speed means comprise a plurality of compound planet gears, each of said plurality of compound planet gears including:

a first plurality of planet gears;

a second plurality of planet gears; and a plurality of planet gear shafts;

wherein unique ones of said first plurality of planet gears, said second plurality of planet gears, and said plurality of planet gear shafts are rigidly connected to produce said plurality of compound planet gears;

a first ring gear in mesh with said first plurality of planet gears; and a second ring gear in mesh with said second plurality of planet gears.

28. The winch of claim 24 wherein said low-speed means and said high-speed means comprise a plurality of compound planet gears, each of said plurality of compound planet gears including:

a first plurality of planet gears; and a second plurality of planet gears;

wherein unique ones of said first and second plurality of planet gears are rigidly connected to produce said plurality of compound planet gears;

a plurality of planet gears shafts, rigidly connected to said winch drum, about which said plurality of compound planet gears rotate;

a first ring gear in mesh with said first plurality of planet gears; and a second ring gear in mesh with said second plurality of planet gears.

* * * * *

UNITED STATES PATENT AND TRADEMARK OFFICE
CERTIFICATE OF CORRECTION

PATENT NO. : 5,842,684
DATED : December 1, 1998
INVENTOR(S) : Richard E. Aho

It is certified that error appears in the above-identified patent and that said Letters Patent is hereby corrected as shown below:

At Column 1, line 16, delete "imitations" and insert --limitations--.

At Column 4, line 33, after "75", delete ",".

At Column 4, line 33, after "(Fig. 2)", delete ",".

At Column 7, line 49, delete "dram" and insert --drum--.

At Column 8, line 54, after "coil", delete "30".

Signed and Sealed this

Twenty-second Day of June, 1999

Attest:

Q. TODD DICKINSON

*Attesting Officer*    Acting Commissioner of Patents and Trademarks